United States Patent
Romanelli et al.

(10) Patent No.: US 11,684,989 B2
(45) Date of Patent: Jun. 27, 2023

(54) METHOD FOR MONITORING A FLAME CUTTING PROCESS

(71) Applicants: IHT Automation GmbH & Co. KG, Baden-Baden (DE); The Penn State Research Foundation, University Park, PA (US)

(72) Inventors: Giuseppe Romanelli, Buehl (DE); Marcel Biskaborn, Oberkirch (DE); Christopher Reed Martin, Hollidaysburg, PA (US)

(73) Assignees: IHT Automation GmbH & Co. KG, Baden-Baden (DE); The Penn State Research Foundation, University Park, PA (US)

( * ) Notice: Subject to any disclaimer, the term of this patent is extended or adjusted under 35 U.S.C. 154(b) by 77 days.

(21) Appl. No.: 17/367,857

(22) Filed: Jul. 6, 2021

(65) Prior Publication Data
US 2023/0008895 A1    Jan. 12, 2023

(51) Int. Cl.
*B23K 7/10*       (2006.01)
*F23D 14/32*      (2006.01)

(52) U.S. Cl.
CPC .............. *B23K 7/102* (2013.01); *F23D 14/32* (2013.01)

(58) Field of Classification Search
None
See application file for complete search history.

(56) References Cited

U.S. PATENT DOCUMENTS

| | | | |
|---|---|---|---|
| 2,364,645 A | 12/1944 | Mott et al. | |
| 3,823,928 A * | 7/1974 | Stolin | B23K 7/102 219/124.02 |
| 4,328,049 A | 5/1982 | Richardson | |
| 4,439,249 A * | 3/1984 | Singh | B23K 7/10 148/195 |
| 5,470,047 A | 11/1995 | Shin et al. | |
| 2016/0018812 A1 | 1/2016 | Martin | |

FOREIGN PATENT DOCUMENTS

| | | |
|---|---|---|
| DE | 1 954 030 A | 5/1971 |
| DE | 30 07 228 A1 | 9/1980 |

OTHER PUBLICATIONS

German Search Report dated Feb. 24, 2022 in German Application No. 10 2021 123 839.0 with English translation of the relevant parts.

* cited by examiner

*Primary Examiner* — Scott R Kastler
(74) *Attorney, Agent, or Firm* — Collard & Roe, P.C.

(57) ABSTRACT

A method for monitoring a flame cutting process includes a preheating phase, a piercing phase following the preheating phase and a cutting phase following the piercing phase, wherein a cutting torch applies a flame generated by combustion of a gas mixture to an electrically conductive workpiece and wherein an electric current flowing between an electrically conductive part of the cutting torch and the workpiece is measured by a current measuring device during a measuring period. An ignition point at which piercing of a hole through the workpiece using the flame starts due to oxidation of the workpiece is detected by a change in the measured current.

16 Claims, 1 Drawing Sheet

METHOD FOR MONITORING A FLAME CUTTING PROCESS

This invention was made with government support under Grant No. CMMI1900698 awarded by the National Science Foundation. The Government has certain rights in the invention.

BACKGROUND OF THE INVENTION

1. Field of the Invention

The invention relates to a method for monitoring a flame cutting process.

2. Description of the Related Art

In a flame cutting process, a cutting torch generates a flame by burning a gas mixture and applies it to a workpiece to be cut. The workpiece is first heated during a preheating phase before the flame pierces a hole through the tool in a piercing phase. Following the piercing phase, the workpiece is cut in a cutting phase by moving the torch at a distance from the tool along a cutting line. The distance between the cutting torch and the workpiece is adjusted differently in the various phases. While in the preheating phase, rapid heating is preferred by setting a small distance, in the piercing phase material such as slag often sprays from the workpiece, so that the cutting torch is then preferably moved further away from the workpiece. After piercing the hole and during the transition to the cutting phase, the distance to the workpiece is then usually reduced again. The progress of the flame cutting process is usually monitored by an operator who recognizes which of the phases the flame cutting process is in. This is time-consuming and often less reliable.

SUMMARY OF THE INVENTION

It is therefore the task of the invention to further develop a process of the type described above in such a way that it can be automated to a greater extent.

These and other tasks are solved by a method having the features according to the invention. Advantageous further developments of the invention are discussed below.

The invention is based on the idea that the flame is electrically conductive and thus an electric current can flow through the flame, provided that at least a part of the cutting torch and the workpiece are each electrically conductive. The possibility of automatically detecting the ignition point at which piercing of the hole through the workpiece by means of the flame begins by oxidation of the workpiece, based on a change in the measured current flowing through the flame to the workpiece via the cutting torch, has been found experimentally by the applicant. It is thus possible to detect when piercing of the hole through the workpiece begins by monitoring the measured current, so that distance control can then be automatically performed without the need for operator intervention.

It is possible to measure an electric current flowing between the electrically conductive part of the cutting torch and the workpiece through the flame without applying an external voltage. However, to increase the accuracy of the method, it is preferred that a constant voltage is applied by means of a voltage source between an electrically conductive part of the cutting torch and the workpiece at least during the measurement period during which the current is measured. The voltage preferably is a direct current (DC) voltage, but can also be an alternating current (AC) voltage.

According to a first embodiment, the voltage applied during the measurement period is at most as large as a first predetermined voltage, and the ignition point is detected by a drop in the measured current. The first predetermined voltage is expediently less than 5 volts and preferably at most 4 volts, further preferably at most 3 volts. It has been found experimentally that at such low voltages, a significant drop in the measured current is detectable at the ignition point.

According to a second preferred embodiment, the voltage applied during the measurement period is at least as high as a second predetermined voltage, and the ignition point is detected by an increase in the measured current. The second predetermined voltage is suitably at least 5 volts and preferably at least 6 volts. It has been found experimentally that at such voltages a significant increase in the measured current can be detected at the ignition point.

It is advisable to keep the distance between the cutting torch and the workpiece constant during the measurement period. This prevents the measured current from changing due to a change in the distance. For the same reason, the gas mixture supplied to the flame is kept constant during the measurement period.

If the ignition point is detected by applying a low voltage, which is at most as high as the first predetermined voltage, by a drop in the measured current, it can be provided according to an advantageous further embodiment of the invention that the ignition point is further detected by an increase in the measured current during the preheating phase preceding the drop. It has been found experimentally that typically before reaching the ignition point in the preheating phase the measured current increases approximately continuously. This increase preceding the following drop in the measured current can be considered as a further indication that the ignition point has been reached, in order to make the detection of the ignition point more reliable.

Expediently, after the detection of the ignition point, the distance of the cutting torch to the workpiece and the gas mixture supplied to the flame are controlled by means of a control device. Preferably, the distance between the cutting torch and the workpiece is increased by means of the control device. After completion of the piercing of the hole, the distance between the cutting torch and the workpiece is preferably reduced again by means of the control device. In addition, after the ignition point has been detected, the quantity and/or proportion of combustible gas in the gas mixture is increased by means of the control device, and additional cutting oxygen is supplied to the flame.

It is preferred that the workpiece is grounded during the measurement period. It is also preferred that the electrically conductive part of the cutting torch is electrically insulated from the workpiece so that an electric current can flow between the cutting torch and the workpiece only through the flame. It is expedient that the electrically conductive part of the cutting torch has a torch tip facing the workpiece.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
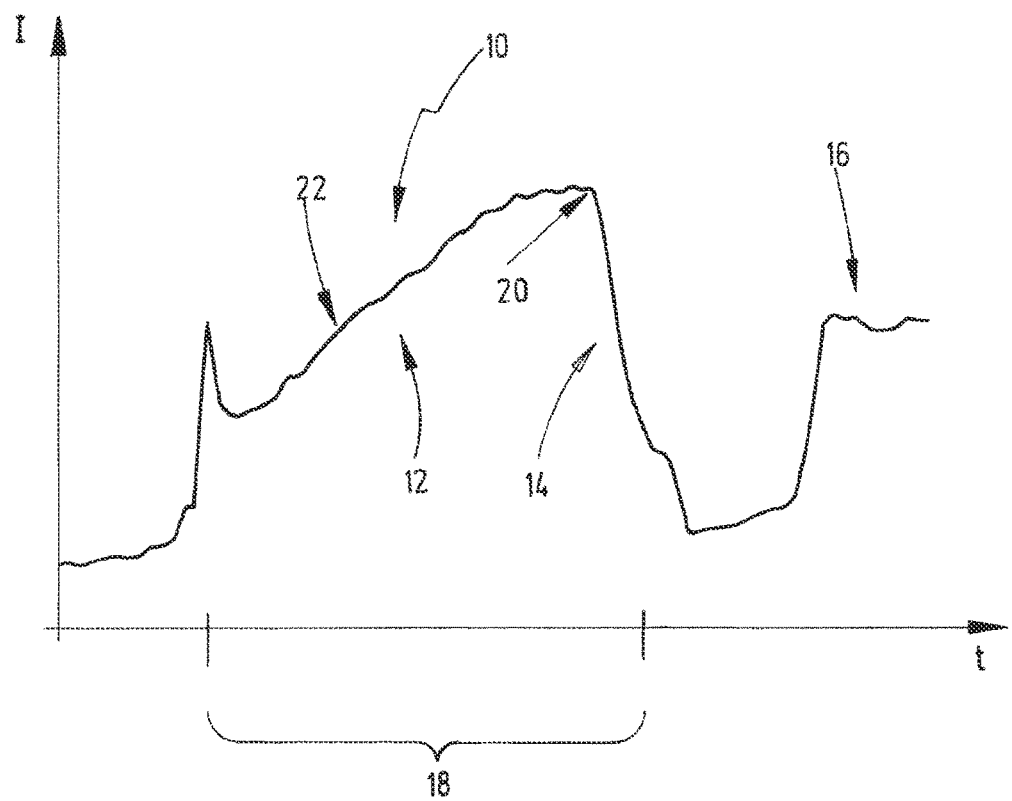
FIG. 1 shows the current plotted over time measured in a method for monitoring a flame cutting process according to a first embodiment.

The current curves shown in the drawing were each measured during a flame cutting process 10 and are used to monitor the flame cutting process 10. Thereby, a current I is measured that flows from an electrically conductive torch tip of the cutting torch used in the flame cutting process 10 through a flame generated by the cutting torch to the electrically conductive workpiece that is grounded and acted upon by the flame. In the flame cutting process 10, the workpiece is first heated by means of the flame in a preheating phase 12. The preheating phase 12 is followed by a piercing phase 14, in which the heated workpiece is oxidized in the area of the flame and the flame pierces a hole through the workpiece. Once a hole has been pierced through the workpiece, it can be cut through along a cutting line by moving the flame along the cutting line during a cutting phase 16 by moving the cutting torch.

By means of a DC voltage source, a constant DC voltage is applied between the torch tip and the workpiece during a measuring period 18 comprising the preheating phase 12 and the beginning of the piercing phase 14, which in the first embodiment shown in FIG. 1 is 3 volts, and the distance of the torch tip from the workpiece is kept constant, as is the composition of the gas mixture supplied to the flame. A current measuring device is used to measure the current I flowing from the torch tip through the flame to the workpiece, which is plotted over time t in FIG. 1. The start of the piercing phase 14, referred to as ignition point 20, is characterized by an abrupt drop in the measured current I. A further characteristic of the ignition point 20 is an almost continuous increase 22 of the measured current I during the preheating phase 12 preceding it.

Figure 2:
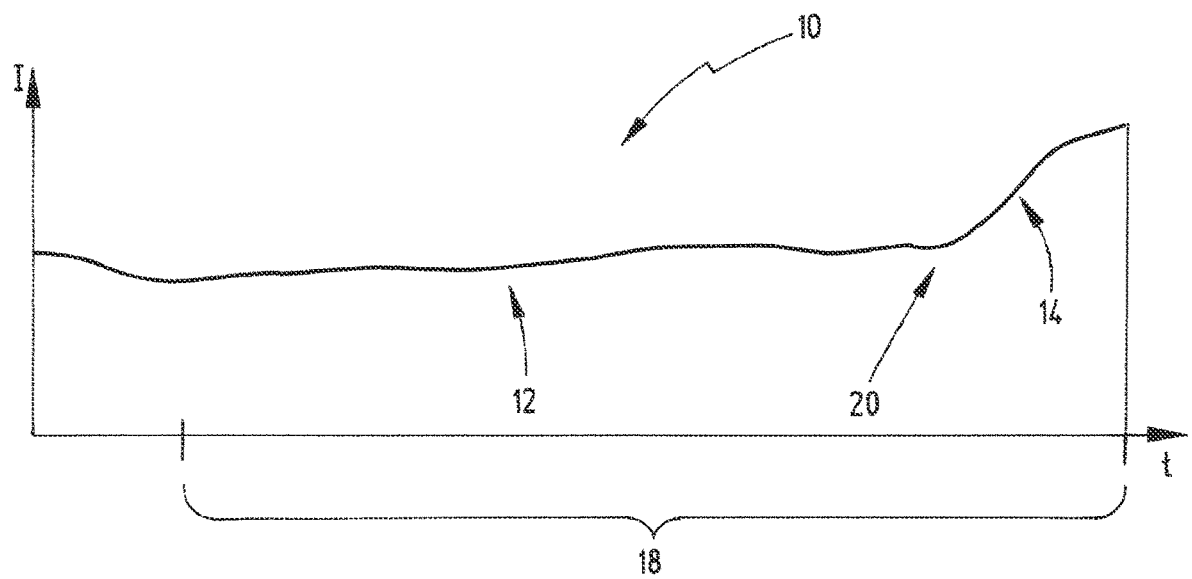
FIG. 2 shows the current plotted over time measured in a method for monitoring a flame cutting process according to a second embodiment.

The second embodiment example according to FIG. 2 differs from the first embodiment example only in that a higher DC voltage of constant 6 volts is applied during the measuring period 18, which results in a fundamentally different course of the measured current I over time t. The ignition point 20 marking the end of the preheating phase 12 and the beginning of the piercing phase 14 of the flame cutting process 10 is characterized in this embodiment by a characteristic abrupt increase of the measured current I. Also, the continuous increase 22 of the measured current I during the preheating phase 12 that occurs in the first embodiment is not present here.

The described detection of the ignition point 20 based on the change in the measured current I is used to control the flame cutting process 10. While in the preheating phase 12 a maximum heat input into the workpiece is aimed at, for which purpose the distance between the torch tip and the workpiece is kept small, an increase of this distance during the piercing phase 14 is advantageous in order to avoid damage to the cutting torch by high-splashing slag. If the characteristic change of the measured current I at the ignition point 20 is identified and thus the ignition point 20 is automatically detected, the distance between the torch tip and the workpiece is automatically increased by means of a control device. Furthermore, the proportion of combustible gas in the gas mixture supplied to the flame is increased, and additional cutting oxygen is supplied to the flame. After the end of the piercing phase 14 and at the beginning of the cutting phase 16, the distance between the torch tip and the workpiece is reduced again. Over the entire period of the flame cutting process 10, i.e. beyond the measuring period 18, the DC voltage is kept constant in the embodiments shown here. The measured current I is then influenced not only by the conductivity of the flame, but also by the changing distance between the torch tip and the workpiece.

In summary, the following should be noted: The invention relates to a method for monitoring a flame cutting process 10, which comprises a preheating phase 12, a piercing phase 14 following the preheating phase 12, and a cutting phase 16 following the piercing phase 14, wherein a cutting torch applies a flame generated by combustion of a gas mixture to an electrically conductive workpiece, and wherein an electric current I flowing between an electrically conductive part of the cutting torch and the workpiece is measured by means of a current measuring device during a measuring period 18. According to the invention, an ignition point 20 at which piercing of a hole through the workpiece by means of the flame starts due to oxidation of the workpiece is detected by a change in the measured current I.

Although only a few embodiments of the present invention have been shown and described, it is to be understood that many changes and modifications may be made thereunto without departing from the spirit and scope of the invention.

What is claimed is:

1. A method for monitoring a flame cutting process, which comprises a preheating phase, a piercing phase following the preheating phase and a cutting phase following the piercing phase,
    wherein a cutting torch applies a flame generated by combustion of a gas mixture to an electrically conductive workpiece,
    wherein an electric current flowing between an electrically conductive part of the cutting torch and the workpiece is measured by means of a current measuring device during a measuring period,
    wherein an ignition point at which piercing of a hole through the workpiece by means of the flame starts due to oxidation of the workpiece is detected by a change in the measured current,
    wherein a constant voltage is applied by means of a voltage source between the electrically conductive part of the cutting torch and the workpiece at least during the measuring period,
    wherein the voltage is at most as large as a first predetermined voltage, and
    wherein the ignition point is detected by a drop in the measured current.

2. The method according to claim 1, wherein the voltage is a DC voltage.

3. The method according to claim 1, wherein the voltage is an alternating voltage.

4. The method according to claim 1, wherein the distance between the cutting torch and the workpiece is kept constant during the measuring period.

5. The method according to claim 1, wherein the gas mixture supplied to the flame is kept constant during the measuring period.

6. The method according to claim 1, wherein the ignition point is detected by a drop in the measured current, wherein the ignition point is further detected by an increase in the measured current during the preheating phase preceding the drop.

7. The method according to claim 1, wherein, after detection of the ignition point, the distance of the cutting torch from the workpiece and the gas mixture supplied to the flame are controlled by means of a control device.

8. The method according to claim 7, wherein, after detection of the ignition point, the distance of the cutting torch from the workpiece is increased by means of the control device.

9. The method according to claim 8, wherein, after completion of the piercing of the hole, the distance of the cutting torch from the workpiece is reduced again by means of the control device.

10. The method according to claim 7, wherein, after detection of the ignition point by means of the control device, the quantity and/or proportion of the combustible gas in the gas mixture is increased and additional cutting oxygen is supplied to the flame.

11. The method according to claim 1, wherein the ignition point is detected by a drop in the measured current, wherein the first predetermined voltage is less than 5 volts.

12. The method according to claim 1, wherein the workpiece is grounded during the measurement period.

13. The method according to claim 1, wherein the electrically conductive part of the cutting torch is electrically insulated from the workpiece.

14. The method according to claim 1, wherein the electrically conductive part of the cutting torch has a torch tip facing the workpiece.

15. The method according to claim 11, wherein the first predetermined voltage is less than 4 volts.

16. The method according to claim 11, wherein the first predetermined voltage is less than 3 volts.

* * * * *